United States Patent [19]

Arahata et al.

[11] Patent Number: 4,763,613
[45] Date of Patent: Aug. 16, 1988

[54] EXHAUST TIMING CONTROL SYSTEM FOR A TWO CYCLE ENGINE

[75] Inventors: Yoshitaka Arahata; Masayuki Toriyama, both of Saitama, Japan

[73] Assignee: Honda Giken Kogyo Kabushiki Kaisha, Tokyo, Japan

[21] Appl. No.: 8,712

[22] Filed: Jan. 29, 1987

[30] Foreign Application Priority Data

May 14, 1986 [JP] Japan ................................ 61-111636

[51] Int. Cl.$^4$ ............................................. F02B 75/02
[52] U.S. Cl. ................................ 123/65 PE; 123/323
[58] Field of Search ................ 123/323, 65 PE, 65 P, 123/65 V

[56] References Cited

U.S. PATENT DOCUMENTS

| | | | |
|---|---|---|---|
| 4,121,552 | 10/1978 | Mithuo | 123/65 PE |
| 4,202,297 | 5/1980 | Oku | 123/65 PE |
| 4,333,431 | 6/1982 | Iio | 123/323 |
| 4,341,188 | 7/1982 | Nerstrom | 123/324 |
| 4,364,346 | 12/1982 | Shiohara | 123/323 |
| 4,388,894 | 6/1983 | Tanaka | 123/65 PE |
| 4,391,234 | 7/1983 | Holzleitner | 123/65 V |
| 4,399,788 | 8/1983 | Bostelmann | 123/323 |
| 4,494,506 | 1/1985 | Hayama | 123/348 |
| 4,516,540 | 5/1985 | Nerstrom | 123/65 PE |
| 4,541,371 | 9/1985 | Kageyama | 123/65 PE |
| 4,621,596 | 11/1986 | Uchinishi | 123/65 PE |
| 4,622,928 | 11/1986 | Uchinishi | 123/65 PE |
| 4,651,684 | 3/1987 | Masuda | 123/90.16 |
| 4,706,617 | 11/1987 | Asai et al. | 123/65 PE |

FOREIGN PATENT DOCUMENTS

| | | |
|---|---|---|
| 3232786A1 | 4/1984 | Fed. Rep. of Germany . |
| 47-36047 | 9/1972 | Japan . |
| 51-21038 | 2/1976 | Japan . |
| 51-39112 | 3/1976 | Japan . |
| 51-42497 | 4/1976 | Japan . |
| 51-74623 | 6/1976 | Japan . |
| 51-147813 | 11/1976 | Japan . |
| 52-18333 | 4/1977 | Japan . |
| 52-132916 | 10/1977 | Japan . |
| 54-158514 | 12/1979 | Japan . |
| 55-160107 | 12/1980 | Japan . |
| 56-27014 | 3/1981 | Japan . |
| 56-47609 | 4/1981 | Japan . |
| 57-62917 | 4/1982 | Japan . |
| 57-105511 | 7/1982 | Japan . |
| 58-7059 | 2/1983 | Japan . |
| 58-7060 | 2/1983 | Japan . |
| 58-36818 | 8/1983 | Japan . |
| 59-7008 | 2/1984 | Japan . |
| 59-105928 | 6/1984 | Japan . |

Primary Examiner—Charles J. Myhre
Assistant Examiner—David A. Okonsky
Attorney, Agent, or Firm—Lyon & Lyon

[57] ABSTRACT

An exhaust timing controller for controlling an exhaust timing member in a two cycle engine includes a control circuit for generating a control signal which actuates a mechanism for moving the exhaust timing member. The control circuit controls the member such that the member is drivable in a range from a fully open position to a fully closed position responsive to certain engine conditions including engine speed. A self cleaning cycle is provided which drives the exhaust timing member first to one position limit and then to the other. This may be performed with initial operation of the engine above a specified engine speed with the position of the exhaust timing member being independent of engine speed during cleaning.

6 Claims, 4 Drawing Sheets

EXHAUST TIMING CONTROL SYSTEM FOR A TWO CYCLE ENGINE

BACKGROUND OF THE INVENTION

The field of the present invention is exhaust timing control devices for two cycle engines.

Japanese utility model laid open No. 51-39112(39112/1976), the disclosure of which is incorporated herein by reference, discloses an exhaust timing control device which controls the initiation of the exhaust cycle in a two cycle engine increase power. This exhaust timing control device is provided with a member which can move to a position on an upper portion of an exhaust port in a two cycle engine. In this position, the member controls the timing edge location of the exhaust port in accordance with the speed of the engine to adjust the exhaust timing.

The aforementioned member itself cooperates closely with the wall of the combustion chamber of the engine. Thus, its operation may be affected by carbon buildup from combustion in the engine, dust in the engine oil, etc.

SUMMARY OF THE INVENTION

The present invention is directed to an exhaust timing control system and method for a two cycle engine which provides for smooth engine operation. An exhaust timing member is controlled to undergo alternating movement between position limits by a timing member drive mechanism when the speed of the engine exceeds a preselected value. The system may then operate responsive to certain engine parameters within the position limits. Thus, a cleaning cycle may be effected along with appropriate exhaust timing control.

A motor may be employed to actuate the timing member which may in turn be controlled by a voltage generator circuit actuated by signals from a CPU within a control circuit. In one aspect of the present invention, the control circuit may include wave shaping, memory, A/D conversion, throttle interface, and ignition key switch setting circuits. In operation, the foregoing circuitry may receive ignition pulse, throttle, and timing member position data input to the control circuit. Through a series of programmed steps the CPU within the control circuit can activate the voltage generator circuit causing the motor, through the timing member driving mechanism, to move the timing member to a desired position.

Accordingly, it is an object of the present invention to provide improved two cycle engine operation. Other and further objects and advantages will appear hereinafter.

BRIEF DESCRIPTION OF THE DRAWINGS

In the drawings wherein similar reference characters denote similar elements throughout the several views.

DETAILED DESCRIPTION OF THE PREFERRED EMBODIMENT

Figure 1:
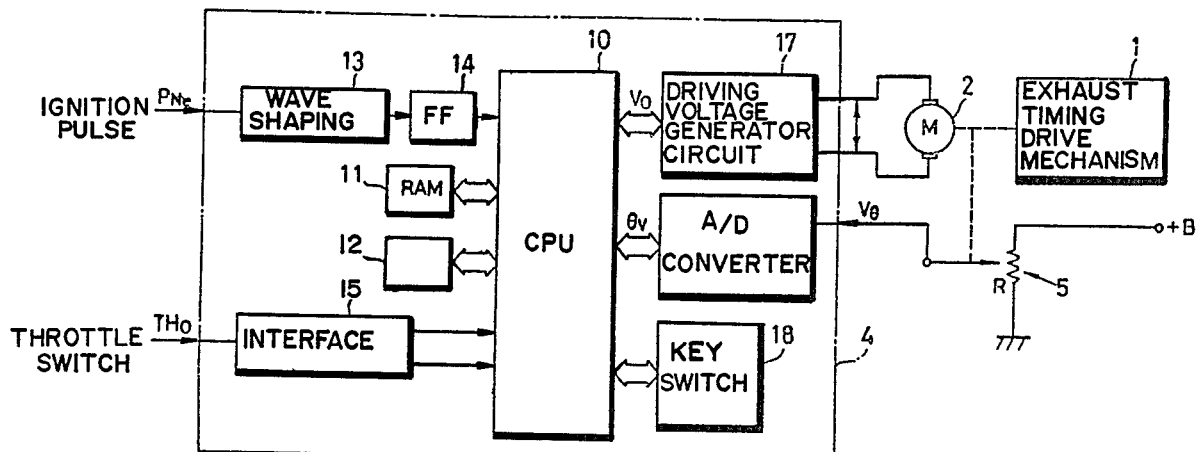
FIG. 1 is a schematic block diagram illustrating an exhaust timing control system according to the present invention.

Referring now to FIG. 1, the exhaust control system according to the present invention includes a mechanism 1 for driving an exhaust timing member (not shown) to adjust the position of an upper edge of an exhaust port in a two cycle engine. Means for driving the exhaust timing member include a direct current motor 2. A motor driving voltage $V_M$ is supplied to the motor 2 from a control circuit 4 so as to move the exhaust timing member to create the desired port opening. The control circuit 4 determines the motor driving voltage $V_M$ from a plurality of inputs. An ignition pulse $P_{Ne}$ obtained from an ignition circuit (not shown) and having a frequency proportional to the rotational frequency of the engine is input to the control circuit 4. The ignition circuit may be, for example, a capacitor discharge type. Also input to the control circuit 4 is a signal $TH_o$ from a throttle switch (not shown), activated when the engine throttle is opened to or beyond a preset amount. Additionally, a voltage $V_\theta$ from an exhaust timing member position sensor 5 which includes, for example, a potentiometer R is input to the control circuit 4.

The position of the exhaust timing member may include and the control system may differentiate among a first position limit or fully closed position $\theta_s$, a middle position $\theta_p$ and a second position limit or fully open position $\theta_o$. The initiation of the exhaust cycle is earliest in the fully open position $\theta_o$ and is retarded as the exhaust timing member is moved toward the fully closed position $\theta_s$. Furthermore, the middle position $\theta_p$ is not limited to one value. Rather, it may include a plurality of middle positions according to the rotational frequency of the engine irrespective of the throttle setting.

The control circuit 4 includes a microcomputer in which a CPU 10 and memories RAM 11 and ROM 12 or the like are connected in a well known manner via bus lines. The ignition pulse $P_{Ne}$ is processed by a wave shaping circuit 13 having, e.g., a one shot multivibrator and by a flip-flop circuit 14, with the ignition pulse $P_{Ne}$ being received into the CPU 10 as rotational frequency data Ne(N). The throttle signal $TH_o$, in this embodiment reflecting a fully open throttle, is simultaneously supplied to an appropriate port of the CPU 10 via an interface circuit 15.

The exhaust timing member position sensor 5 generates an angular position signal $V_\theta$ which indicates, for example, the position or angle of rotation of the electric motor 2, or the displacement from a reference position of an appropriate member of the exhaust timing mechanism 1. The angular position signal $V_\theta$ is digitized by an A/D converter 16 and is received into the CPU 10 as data $\theta_v(N)$ via a bus line.

On the basis of the data Ne(N), $TH_o$, and $\theta_v(N)$, the CPU 10 determines an optimum opening for the exhaust timing member and supplies command voltage data $V_o$ corresponding to this optimum opening to a driving voltage generator circuit 17. The command voltage data $V_o$ includes bits which indicate respectively the plus and minus polarity of the voltage and its magnitude. The driving voltage generator circuit 17 generates a motor driving voltage $V_M$ supplied to the electric motor 2 on the basis of the data $V_o$. A key switch 18 such as an ignition switch facilitates providing the CPU 10 with commands which set a desired initialized condition in a main routine, as further described hereinafter.

Figure 2:
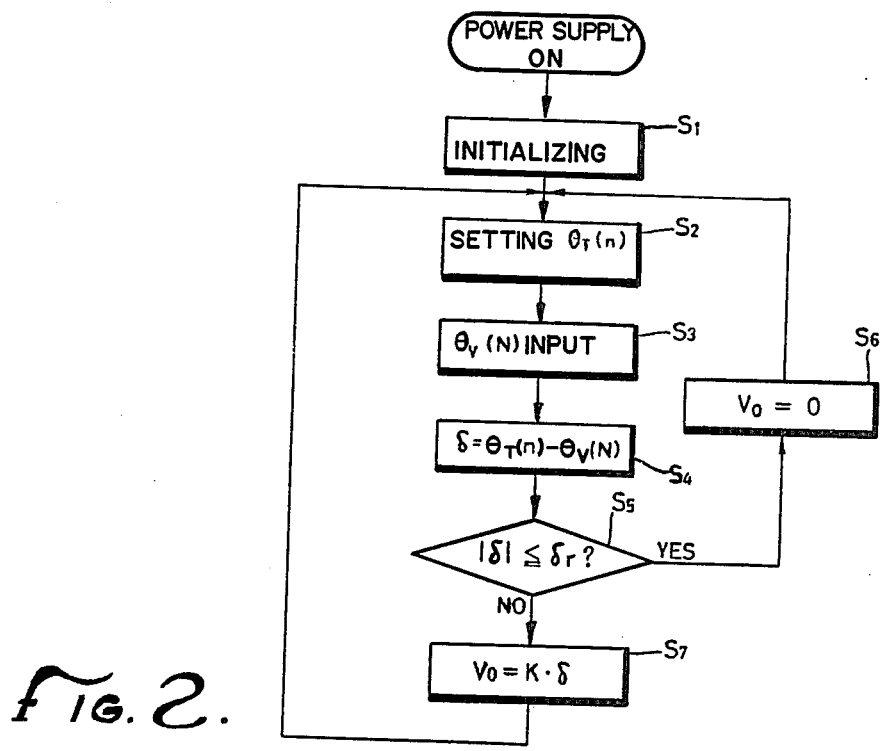
FIG. 2 is a flow chart illustrating the routine in the CPU of FIG. 1 for adjusting the degree of opening of the timing member.

FIG. 2 is a flow chart showing the CPU routine for adjusting the opening of the exhaust timing member. This routine is synchronized with a clock pulse from a self-contained clock generator in the CPU 10.

A power voltage is supplied from a regulated power supply (not shown) to the control circuit 4, for example, by switching on an ignition switch, thereby activating the control circuit 4. The clock pulse is generated from the self-contained clock generator circuit, and the routine is performed with each clock pulse. In this routine, the initialization function is performed immediately after turning on the power supply (step $S_1$). This initialization function is usually carried out in the microcomputer and, for example, includes a function for setting an initial provisional target value for the timing member position $\theta_T(n)$.

The provisional target position $\theta_T(n)$ is set from memory (step $S_2$). The provisional target position $\theta_T(n)$ is either established as part of the initializing function or is calculated in the overflow interrupt routine discussed hereinafter with reference to FIG. 4 as in turn based on the values calculated in the flow chart of FIG. 3. A value $\theta_v(N)$ of the actual measured exhaust timing member position is then received (step $S_3$). Then, the difference $\delta$(including the plus and minus signs) between $\theta_T(n)$ and the $\theta_v(N)$ is derived (step $S_4$), and the absolute value of the difference $|\delta|$ and the threshold value $\delta r$ are compared (step $S_5$). If $|\delta|$ is smaller than the threshold value $\delta r$, the output voltage data $V_o$ is set at zero (step $S_6$) and step $S_2$ is reentered taking in $\theta_T(n)$. The threshold value $\delta r$ is determined within a maximum margin of error including the possibility that $\theta_T(n)$ and $\theta_v(n)$ have coincided with each other, and ideally, $\delta r$ is zero. When $|\delta| > \delta r$, the opening of the exhaust timing member has not reached the desired position. Accordingly, an output voltage $V_o$ having a value proportional to the difference $\delta$ (step $S_7$) is generated.

The driving voltage generator circuit 17, when receiving the data $V_o$ set by the main routine, drives the electric motor 2 by bringing the value of the motor driving voltage $V_M$ to 0, $-V_M$, or $+V_M$, according to the value of Vo (0, $-K\cdot\delta$, $+K\cdot\delta$). The electric motor 2 is then correspondingly stopped, or turns in a reverse or forward direction. The actual position of the exhaust timing member is accordingly changed to the desired position by the operation of the driving mechanism 1. In the driving voltage generator circuit 17, one or the other of the plus and minus power voltages $V_M$ or neither may be connected according to the value of $V_o$ to the output terminal.

Figure 3:
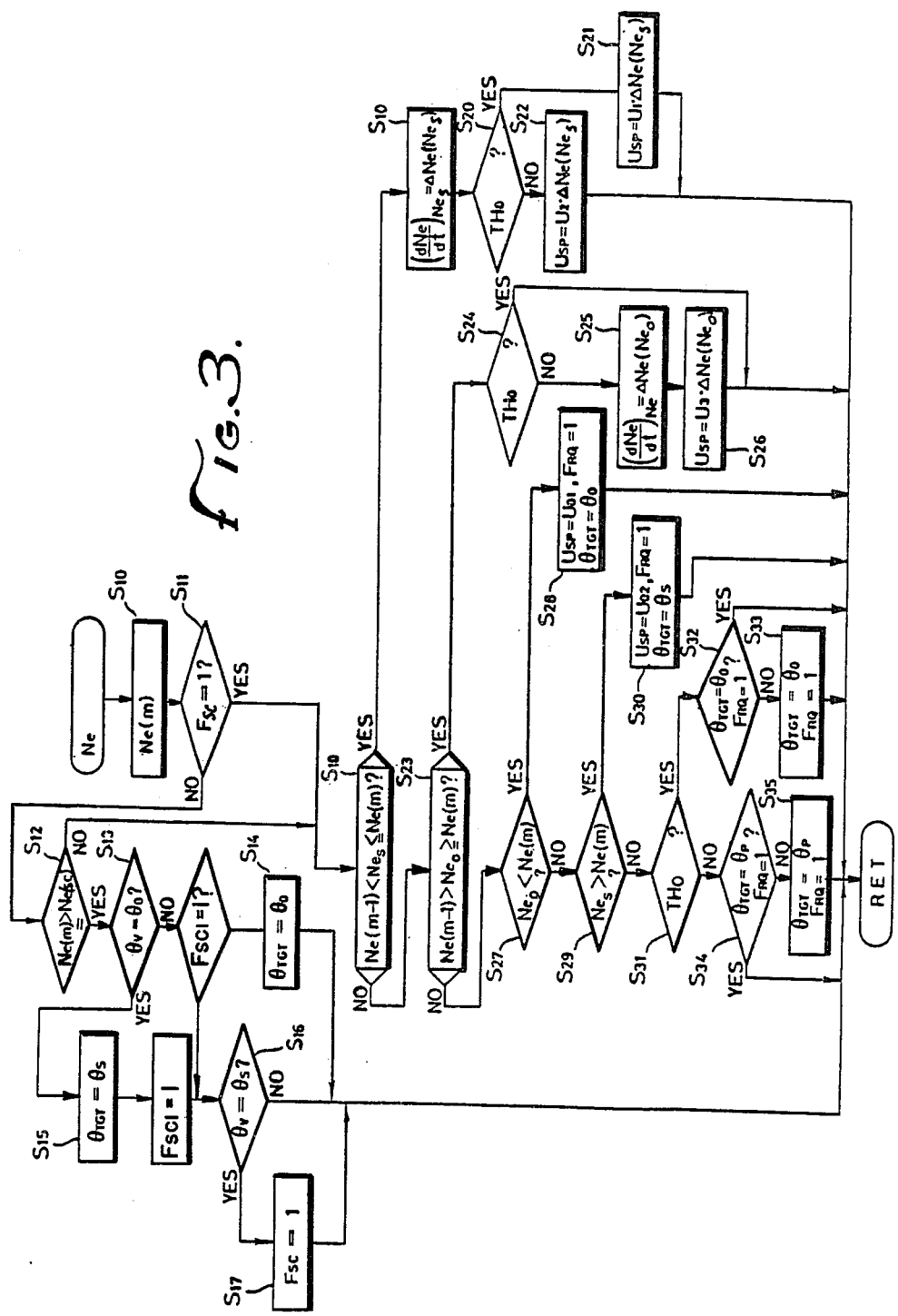
FIG. 3 is a flow chart illustrating a subroutine function performed for every ignition pulse in the CPU of FIG. 1.

FIG. 3 is a flow chart demonstrating a subroutine performed for every ignition pulse $P_{Ne}$ in the CPU 10. In this routine, a self-contained counter is triggered by the ignition pulse $P_{Ne}$ so as to count the rotational frequency, or speed, of the engine Ne(m) with the data showing a reciprocal of a pulse distance between the ignition pulses $P_{Ne}$ (step $S_{10}$). Then, a determination is made as to whether or not a self-cleaning complete flag $F_{sc}$ is present (step $S_{11}$). If $F_{sc} = 1$, the self-cleaning operation is not performed. If the self-cleaning complete flag is not present, $F_{sc}=0$, the just determined speed Ne(m) is compared with a minimum required engine speed N(sc) beyond idle, for example, 1500 rpm. The self-cleaning operation is then not performed since if Ne(m)<Ne(sc) the rotational speed of the engine is not sufficient. If the self-cleaning operation was to be performed before the rotational speed of the engine is high enough, the fully open state of the exhaust timing member would temporarily occur and the rotational speed of the engine may become unstable.

When Ne(m)≧Ne(sc), the self-cleaning operation is carried out. First, $\theta_v(N)$ is compared with $\theta_o$ (step $S_{13}$). When $\theta_o$ is not equal to $\theta_v(N)$, an interim self-cleaning Flag $F_{scl}$ is checked. If the flag $F_{scl}$ is not present, a target position $\theta_{TGT}$ is set to $\theta_o$ (step $S_{14}$) thereby entering into a return function. Then, when $\theta_v(N)$ becomes equal to $\theta_o$ by moving the exhaust timing member open, the target position $\theta_{TGT}$ is reset at $\theta_{TGT} = \theta_s$ (step $S_{15}$). The interim self-cleaning complete flag $F_{scl}$ is then set. A determination is made as to whether $\theta_v(N)$ is equal to $\theta_s$ (step $S_{16}$). Until $\theta_v(N)$ becomes equal to $\theta_s$, the return operation is entered by recognizing the flag $F_{scl}$ and retaining $\theta_{TGT} = \theta_s$. When $\theta_v(N) = \theta_s$ the self-cleaning operation is complete and the self-cleaning complete flag is set, Fsc=1 (step $S_{17}$), and the control enters into the return operation. Thus, after turning on the power supply and after N(m)≧Ne(sc) the self-cleaning operation is performed.

The self-cleaning complete flags Fsc and Fscl are set to 0 in the initialization step $S_1$ of the main routine. It is also possible to perform the desired number of the self-cleaning functions in such a manner that the function is performed until a variable K becomes a maximum value by having Fsc taken as K such that K becomes K+1 for every termination of one self-cleaning function cycle.

When $F_{sc} = 1$, the last preceding value Ne(m) of the data of the rotational frequency is compared with a fully closed threshold value Ne$_s$, the speed of the engine at which point the timing member is desired to be fully closed, and it is determined whether the last preceding value Ne(m−1) satisfies the relationship Ne(m−1)<Ne$_s$≦Ne(m) or not (step $S_{18}$). When this inequality relationship exists, it is sensed as a moment when the rotational frequency Ne of the engine has exceeded the fully closed threshold value Ne$_s$. In this case, the change in speed, that is, an acceleration (dNe/dt) (Ne$_s$) of the rotational frequency Ne of the engine is counted at that time (step $S_{19}$). Here, (dNe/dt)(Ne$_s$) is represented as ΔNe(Ne$_s$). Then, the presence or absence of the fully open throttle signal TH$_o$ is determined (step $S_{20}$). In the presence of the signal TH$_o$, the amount of step $U_{sp}$ is selected as the fully open amount of step $U_{spo} = U_1 \cdot \Delta Ne(Ne_s)$ (step $S_{21}$). In the absence of TH$_o$, the amount of step $U_{sp}$ is operated as the first middle opening amount of step $U_{spp1} = U_2 \cdot \Delta Ne(Ne_s)$ and enters into the return function. Here, $U_1$, $U_2$ are constant, preferably with $U_1 > U_2$.

When the inequality Ne(m−1)<Ne$_s$≦N(m) does not exist, the control device decides whether the inequality Ne(m−1)>Ne$_o$≧Ne(m) is valid or not (step $S_{23}$). If this inequality is valid, it is a moment when the rotational frequency Ne of the engine is less than the fully open threshold value Ne$_o$. In preparation for closing the timing member, presence of the fully open signal TH$_o$ of throttle is determined (step $S_{24}$). In the presence of TH$_o$, the control device enters into the return function without performing other steps. On the other hand, in the absence of the TH$_o$, the exhaust timing member is adapted to the middle opening position $\theta_p$. After counting $(dNe/dt)(Ne_o) = \Delta Ne(Ne_o)$ (step $S_{25}$), the amount of step $U_{sp}$ is considered as the second middle amount of step, $U_{spp2} = U_3 \cdot \Delta Ne(Ne_o)$ (step $S_{26}$). Further, $U_3$ is a constant and as $U_2 = U_3$, $U_{spp1}$ may equal $U_{spp2}$.

When the inequality of step $S_{23}$ is not valid, the present value of the rotational frequency of the engine Ne(m) is compared with the fully open threshold value $Ne_o$ (step $S_{27}$). When Ne(m) is larger than $Ne_o$, the final target position $\theta_{TGT}$ is set at the fully open position data $\theta_o$ and the amount of step $U_{sp}$ is set at a predetermined value $U_{o1}$. Simultaneously, an opening and closing demand flag $F_{RQ}$ is set up and the return function is entered (step $S_{28}$)

When Ne(m) is less than $Ne_o$, Ne(m) is compared with $Ne_s$ (step $S_{29}$). When Ne(m) is less than $Ne_s$, the final target position $\theta_{TGT}$ is set at the fully closed position $\theta_s$. Simultaneously, $F_{RQ}$ is set up and the amount of step $U_{sp}$ is set a predetermined value $U_{o2}$ (step $S_{30}$). If Ne(m) is larger than $Ne_s$, Ne(m) is between the $Ne_s$ and the $Ne_o$, and then the presence of the fully open throttle $TH_o$ is checked (step $S_{31}$). When $TH_o$ exists, the control device checks whether the timing member is being moved toward full open, that is, whether the conditions of $\theta_{TGT} = \theta_o$ and $F_{RQ} = 1$ are satisfied or not (step $S_{32}$). If the conditions are valid, the return function is entered without other steps. If it is not valid, the return function is entered as $\theta_{TGT} = \theta_o$ and $F_{RQ} = 1$ (step $S_{33}$). In the absence of the fully open throttle signal $TH_o$, the opening of the exhaust valve is set to the middle opening position $\theta_p$, and the condition of movement to the middle opening position, that is, the condition of $\theta_{TGT} = \theta_p$ and $F_{RQ} = 1$ is established (step $S_{34}$). If this condition is satisfied, the return function is entered without other steps. If the condition is not satisifed, the return function is entered as $\theta_{TGT} = \theta_p$ and $F_{RQ} = 1$ (step $S_{35}$). By the aforementioned function modes, the final intended value $\theta_{TGT}$ and the amount of step $U_{sp}$ are continuously updated and are always the optimum value for every $P_{Ne}$ pulse.

Alternatively, the provisional target position $\theta_T(n)$ may be calculated solely on the instantaneous engine speed without including variable timing member response rates responsive to acceleration of the engine.

The flow chart of FIG. 3 is performed by interrupting the main routine with every engine ignition pulse $P_{Ne}$. A provisional target value setting mode serves to control a function mode which determines a present provisional target value $\theta_T(N)$. $\theta_T(N)$ is established by the function mode with respect to the finally intended or final target value $\theta_{TGT}$ such that $\theta_T(N)$ gradually approaches $\theta_{TGT}$. The provisional target value setting mode is performed by an overflow interrupt routine which employs a timer (not shown) to count by means of the clock self-contained in the CPU and which is performs for every desired time.

Figure 4:
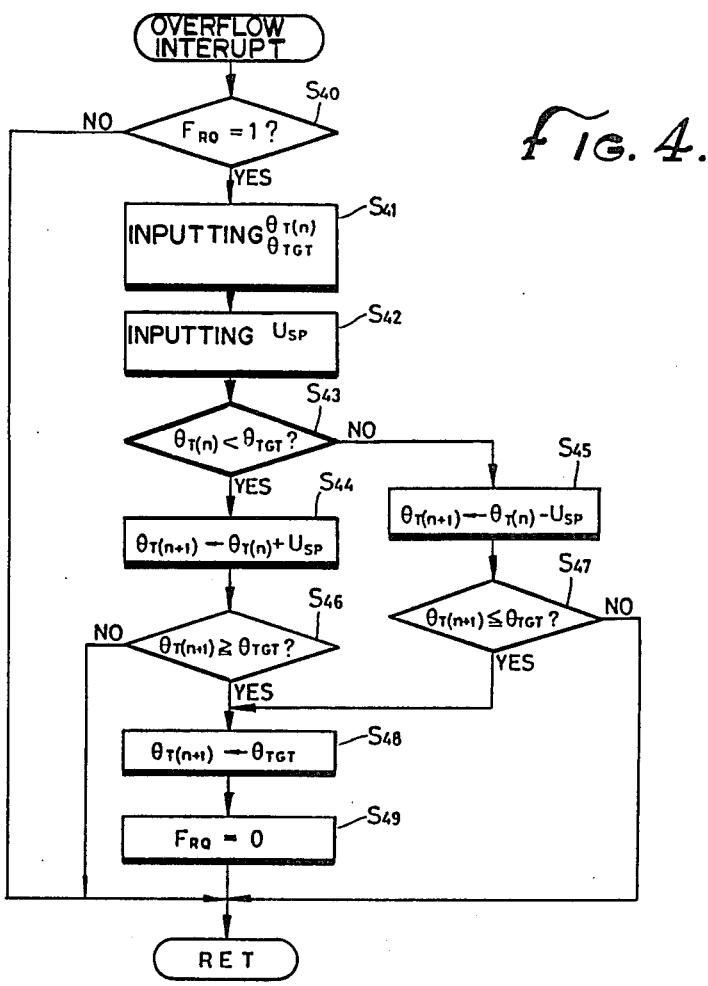
FIG. 4 is a flow chart illustrating an overflow interruption routine.

FIG. 4 is flow chart which shows the overflow interrupt routine for execution of the provisional target value setting mode and the counting mode. First, when the self-contained timer overflows, the control system determines whether the opening and closing demand flag $F_{RQ}$ is present (1) or not (0). If $F_{RQ} = 0$, the routine returns to the CPU routine. If $F_{RQ} = 1$, the provisional target value setting mode is to be performed. The present provisional value $\theta_T(n)$ and the final target value $\theta_{TGT}$ are taken from the memory (step $S_{41}$). Then, the amount of step $U_{sp}$ therein is received (step $S_{42}$). By comparing magnitudes of $\theta_{TGT}$ and $\theta_T(n)$ thus taken, a decision is made whether to open or close the timing member (step $S_{43}$). If $\theta_T(n)$ is less than $\theta_{TGT}$, the provisional target value is charged by taking $\theta_T(n) + U_{sp}$ as a final value to increase the provisional target opening degree by the amount of step $U_{sp}$ (step $S_{44}$). Conversely, if $\theta_T(n)$ is less than $\theta_{TGT}$, the provisionally aimed opening degree $\theta_T(n)$ is decreased by the amount of step $U_{sp}$, as $\theta_T(n+1) = \theta_T(n) - U_{sp}$ (step $S_{45}$).

Then the magnitudes of $\theta_{TGT}$ and $\theta_T(n+1)$ are compared (steps $S_{46}$, $S_{47}$). If $\theta_T(n+1)$ has not reached $\theta_{TGT}$, this mode is terminated); if it has, $\theta_T(n+1)$ is made equal to $\theta_{TGT}$ (step $S_{48}$), the opening and closing demand flag FRQ is set to zero to release it (step $S_{49}$) and this mode is terminated.

Figure 5:
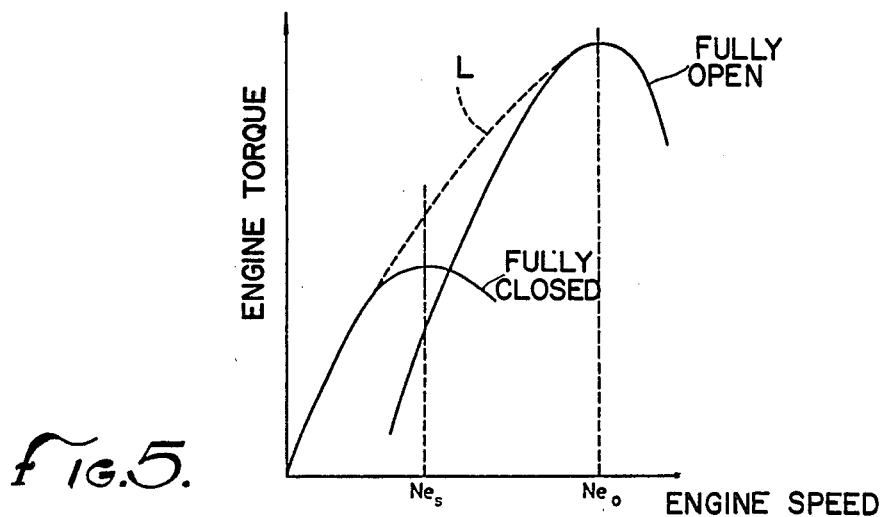
FIG. 5 is a graph plotting engine torque vs. the rotational speed of the engine, with the exhaust timing member fully open and fully closed.

FIG. 5 shows the relationship of engine torque to engine speed having the positioning of the timing member as a parameter of engine speed. When the engine rapidly accelerates, the timing member experiences prompt actuation and the torque rises smoothly, as shown by the dotted line L. There is no reduction in torque as would be experienced with a conventional engine with one setting or a controlled engine exhaust port with the member controlled to be either fully open or fully closed.

Figure 6:
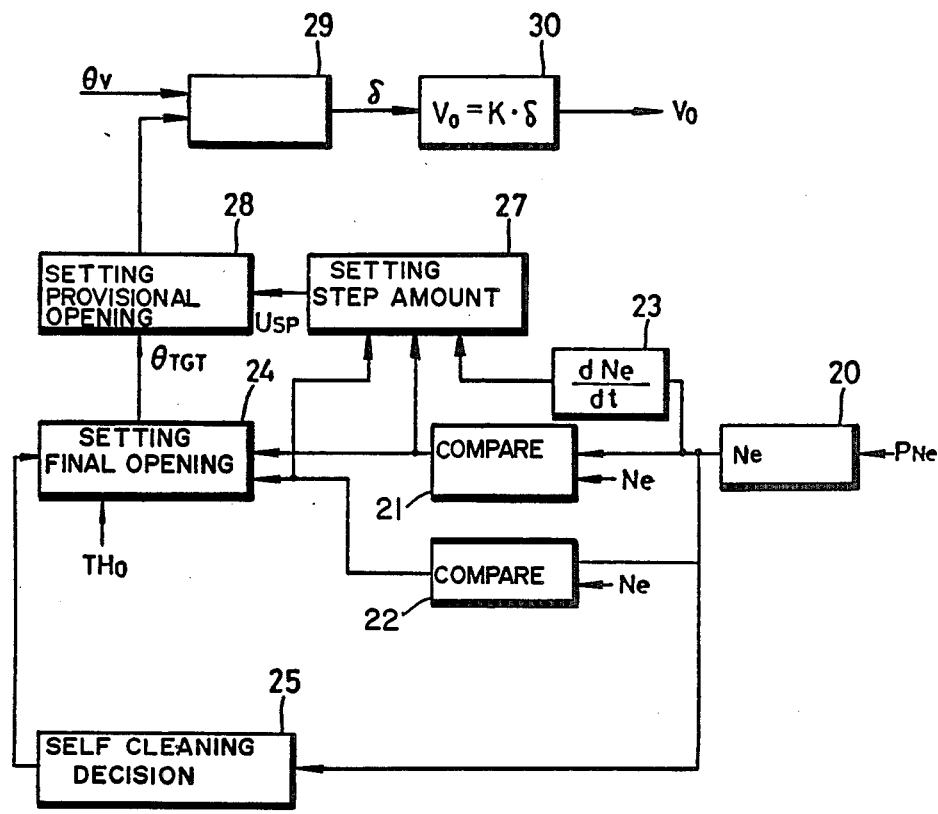
FIG. 6 is a block diagram illustrating operating functions of the CPU in FIG. 1.

FIG. 6 shows a block diagram which illustrates the operating functions of the CPU 10 shown in the flow charts of FIGS. 2 to 4. Operating means 20 generates the data Ne of rotational frequency on the basis of the ignition pulse $P_{Ne}$. The data Ne of rotational frequency is compared with the fully open threshold value $Ne_o$ and the fully closed threshold value $Ne_s$ by means of first and second comparator means 21, 22. The Ne data is differentiated by means of differentiator means 23. Means 24 for setting the final target value sets $\theta_{TGT}$ according to the signal from the first and second comparator means 21, 22 and the fully open signal $TH_o$ of the throttle. Further, the control device may perform the forced setting of the fully open and fully closed opening upon performing the self-cleaning operation mode, which cooperates with the signal from self-cleaning decision means 25.

Means 27 for setting the step amount operate with the signal from the comparator means 21, 22 and the differentiator means 23. Means 28 for setting the provisional target opening degree sets the provisionally aimed opening $\theta_T$ according to the step amount $U_{sp}$ from the means 27 for setting the step amount and according to the final target opening degree $\theta_{TGT}$ from the means 24 for setting the finally aimed opening degree. Subtraction means 29 computes the difference $\delta = \theta_v - \theta_T$ between the $\theta_T$ thus obtained and the real opening degree $\theta_v$ of the exhaust timing member and supplies this difference to multiplier means 30. The multiplier means 30 calculates $V_o = K \cdot \delta$ and outputs the result as a driving voltage data $V_o$ for the timing member.

The behavior of the circuit shown in the block diagram of FIG. 6 is adapted to actuate at the same parameters as that shown in the flow charts of FIGS. 2 to 4.

Thus, an exhaust timing control device is disclosed for a two cycle engine wherein the opening degree of an exhaust port timing member is adjusted according to the engine operating state to effect optimum exhaust timing and a cleaning cycle is provided to prevent disabling buildups on the member. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. An exhaust timing controller for controlling an exhaust timing member in a two cycle engine, comprising
a control circuit having means for generating a working control signal as a function of engine condition, means for generating a self-cleaning cycle having a fully open control signal and a fully closed control signal sequentially and independently of engine condition, and means for initiating said self-cleaning cycle when the engine is running at or greater than a selected engine speed; and
means for driving the exhaust timing member operatively connected to said control circuit.

2. The controller of claim 1 wherein said means for driving comprises an electric motor connected to the exhaust timing member.

3. The controller of claim 2 further comprising a position sensor for detecting the position of the exhaust timing member.

4. An exhaust timing controller for controlling an exhaust timing member in a two cycle engine comprising
a control circuit comprising a CPU, means for providing said CPU with throttle position, ignition pulse, and exhaust timing member position parameter data;
means for processing said data within said CPU to determine optimum exhaust timing member positions between first and second limit positions based on the parameter data and generating a working control signal;
means for generating a self-cleaning cycle having sequentially a first limit control signal and a second limit control signal; and
means for driving the exhaust timing member to the determined optimum position responsive to said control signals.

5. The controller of claim 4 wherein said means for providing includes an interface linked to said CPU for receiving throttle position data, wave shaping circuitry linked to said CPU for receiving ignition pulse data and an A/D converter linked to said CPU for receiving exhaust valve position data.

6. A method for cleaning and controlling an exhaust timing member in a two cycle engine, comprising the steps of
controlling the location of the exhaust timing member responsive to engine speed between first and second position limits;
monitoring engine speed;
initiating a self-cleaning cycle when engine speed is above a predetermined value;
driving the exhaust timing member by said cycle sequentially to the first position limit and the second position limit; and
disabling said cycle.

* * * * *